United States Patent
Satoh

[11] 4,071,714
[45] Jan. 31, 1978

[54] SIGNAL TRANSMISSION SYSTEM
[75] Inventor: Tsuyoshi Satoh, Inazawa, Japan
[73] Assignee: Mitsubishi Denki Kabushiki Kaisha, Japan
[21] Appl. No.: 588,722
[22] Filed: June 20, 1975
[30] Foreign Application Priority Data
June 26, 1974 Japan ................................ 49-73590
[51] Int. Cl.² .................................... H04B 13/00
[52] U.S. Cl. ..................................... 179/82; 325/28; 329/200; 336/220
[58] Field of Search ............... 325/26, 28, 29, 37, 325/391, 392, 393; 343/228; 340/416, 195; 336/170, 220; 329/200; 179/82

[56] References Cited
U.S. PATENT DOCUMENTS

| | | | |
|---|---|---|---|
| 2,810,901 | 10/1957 | Crane | 336/170 |
| 3,016,465 | 1/1962 | Devol et al. | 336/170 |
| 3,194,886 | 7/1965 | Mason | 329/200 |
| 3,273,110 | 9/1966 | Monroe et al. | 325/28 |
| 3,320,541 | 5/1967 | Silverman | 329/200 |
| 3,495,209 | 2/1970 | Engle | 325/28 |
| 3,660,760 | 5/1972 | Schaad et al. | 325/28 |

*Primary Examiner*—Robert L. Griffin
*Assistant Examiner*—Marc E. Bookbinder
*Attorney, Agent, or Firm*—Robert E. Burns; Emmanuel J. Lobato; Bruce L. Adams

[57] ABSTRACT

A signal transmitter supplies a contact closure type signal having a DC level to an electromagnetic coil inductively disposed around a magnetic core. The coil produces a corresponding magnetic flux which is, in turn, detected by a flux detector such as a Hall effect semiconductor element. The detector applies a signal corresponding to the detected magnetic flux to a signal receiver.

5 Claims, 4 Drawing Figures

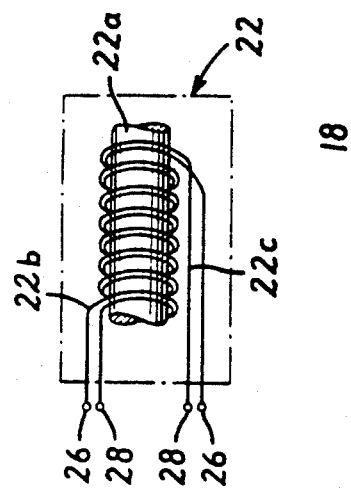
FIG. 4
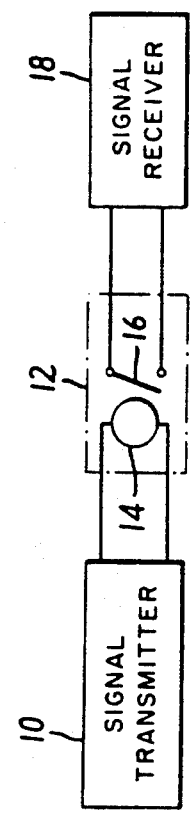
FIG. 1 PRIOR ART
FIG. 2 PRIOR ART
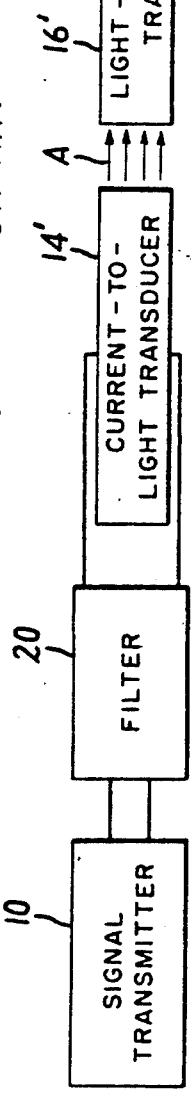
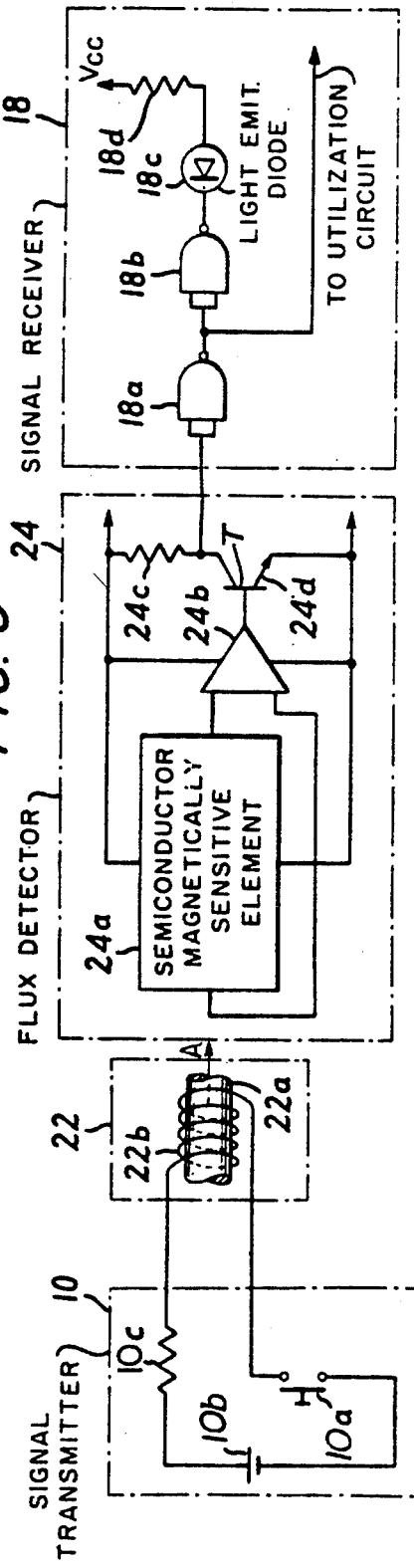
FIG. 3

SIGNAL TRANSMISSION SYSTEM

BACKGROUND OF THE INVENTION

The present invention relates to improvements in a signal transmission system.

The latest automatic control is being developed in its course of enabling the complicated high degree control with the electronic computer and digital integrated circuitry. With signals from conventional signal transmitters received by signal receivers operatively coupled to electronic computers and digital integrated circuitries, there have been encountered difficult problems in potential differences, noise, grounded points etc. and various counter-measures thereto have been already proposed. For example, a relay device has been used to connect the signal transmitter to the signal receiver to maintain the transmitter electrically insulated from the receiver. The use of the relay has been attended with the mechanical operation resulting in a delay of the transmission time, a decrease in useful life of mechanically operating components, the chattering of contacts etc. In order to avoid these objections, the signal transmitter might be connected in electrically insulating relationship to the signal receiver through the utilization of the optical coupling. In the latter event the use of a light emitting diode as a current-to-light transducer has led to the necessity of connecting a filter to the signal transmitter to prevent malfunction due to noise superposed on a signal from the transmitter resulting in an expensive construction. Also with an incandescent lamp used in place of the light emitting diode, the lamp has been required to be often replaced by a new lamp because it is short in useful life although the filter is omitted. Further the maintenance has consumed much labor.

SUMMARY OF THE INVENTION

Accordingly it is an object of the present invention to provide a new and improved signal transmission system for transmitting a signal having a DC level and delivered from a signal transmitter to a signal receiver maintained electrically insulated from the signal transmitter without any mechanical operation.

The present invention accomplishes this object by the provision of a signal transmission system comprising signal transmitter means for delivering a signal having a DC level, magnetic means connected to the signal transmitter means to respond to the signal from the signal transmitter means to produce a corresponding magnetic flux, and flux detector means including a semiconductor magnetically sensitive element magnetically coupled to the magnetic means to detect the magnetic flux from the magnetic means to produce a corresponding signal without any mechanical operation performed whereby the signal from the signal transmitter means is transmitted to the signal receiver means through the cooperation of the magnetic means with the flux detector means.

In a preferred embodiment of the present invention, the magnetic means may comprise an electromagnetic coil inductively disposed around a magnetic core.

In order to transmit a plurality of signals having respective DC level and delivered from the signal transmitter means to the signal receiver means after the signals have been logically processed, the magnetic means may produce a resultant magnetic flux corresponding to the result of logical processing of the signals. For example, one electromagnetic coil may be inductively disposed around the single magnetic core for each of the signals.

BRIEF DESCRIPTION OF THE DRAWINGS

The present invention will become more readily apparent from the folowing detailed description taken in conjunction with the accompanying drawings in which:

FIG. 1 is a block diagram of a signal transmission system constructed in accordance with the principles of the prior art;

FIG. 2 is a view similar to FIG. 1 but illustrating another conventional signal transmission system;

FIG. 3 is a schematic circuit diagram of a signal transmission system constructed in accordance with the principles of the present invention; and FIG. 4 is a schematic view of a modification of the magnetic device shown in FIG. 3.

DESCRIPTION OF THE PREFERRED EMBODIMENTS

Referring now to FIG. 1 of the drawings, there is illustrated a conventional signal transmission system employing a relay device. The arrangement illustrated comprises a signal transmitter 10, a relay device generally designated by the reference numeral 12 including, as the essential components, an electromagnetic coil 14 connected across the signal transmitter 10 and a movable contact 16, and a signal receiver 18 connected to the movable contact 16. The signal reciever 18 includes an electronic computer, digital integrated circuits etc. although the computer, integrated circuits etc. are not illustrated.

In operation an electrical input signal from the signal transmitter 10 is applied to the electromagnetic coil 12 to engage the movable contact with its mating stationary contact through mechanical means. That is, the input signal energizes the electromagnetic coil 12 to produce a magnetic flux in an associated iron core (not shown) thereby to attract the associated movable iron piece (also not shown) by the iron core resulting in the closure of the movable contact 16. When the input signal disappears to deenergize the electromagnetic coil 12, the movable iron core is returned back to its original position as by the action of a spring or the like operatively coupled thereto. This results in the separation of the movable contact 16 from the stationary contact. In this way the movable contact 16 is closed and opened to transmit the input signal from the transmitter 10 to the receiver 18.

While the movable contact 16 has been described as being closed and opened through the movable iron piece (not shown) the same may be directly closed and opened through the magnetic action resulting from the magnetic flux produced by the electromagnetic coil 14 as by using a reed relay (not shown).

In the arrangement as above described, the relay 12 can readily maintain the electrically insulating relationship between the signal transmitter and receiver 10 and 18 respectively, but the utilization of the mechanical means as above described has caused many problems such as a delay of the transmission time, a decrease in useful life of mechanically operating components, the chattering of contacts etc.

FIG. 2 shows a modification of the arrangement as illustrated in FIG. 1. The arrangement illustrated comprises a signal transmitter 10, a current-to-light transducer 14' connected to the transmitter 10 through a filter 20, a light-to-current transducer 16' optically coupled to the current-to-light transducer 14' and a signal receiver 18.

An electrical input signal from the signal transmitter 10 is applied to the filter 20 where noise included in the signal is filtered out and the signal is limited in current. The filter 10 generally includes an R-C filter circuit formed of a resistor or resistors and a capacitor or capacitors. In other words, the filter is formed of an integrating circuit utilizing the charging and discharging of the capacitor.

The current limited signal from the filter 20 is supplied to the current-to-light transducer 14'. The transducer 14' emits light having an optical quantity corresponding to the magnitude of the signal in the direction of the arrow A shown in FIG. 2. Then the light-to-current transducer 16' receives the light emitted from the transducer 14' to convert it to a corresponding current which is, in turn, supplied to the signal receiver 18. Well known examples of the current-to-light transducer 14 involve incandescent lamps, light emitting diodes etc. and those of the light-to-current transducer involve phototransistors and the like.

Therefore the arrangement of FIG. 2 can transmit the input signal from the signal transmitter 10 to the signal receiver 18 without any mechanical operation.

Where the current-to-light transducer 14' operative at a high speed, for example, a light emitting diode is used, the filter 20 is an essential component in order to prevent any malfunction due to noise. This results in an expensive construction. On the other hand, the use of an incandescent lamp or the like as the current-to-light transducer 14' eliminates the necessity of using the filter 20 but it is required to often exchange the lamp because of a short life thereof. This leads to the maintenance consuming much labor.

The present invention contemplates to eliminate the disadvantages of the prior art practice as above described by the provision of a signal transmission system enabled to transmit a signal having a DC level and delivered from a signal transmitter to a signal receiver electrically insulated from the transmitter without any mechanical operation performed.

Referring now to FIG. 3, there is illustrated a signal transmission system constructed in accordance with the principles of the present invention. The arrangement illustrated comprises a signal transmitter 10, a magnetic device generally designated by the reference numeral 22 and connected to the signal transmitter 10, a flux detector 24 magnetically coupled to the magnetic device 22 and a signal receiver 18.

The signal transmitter 10 includes a pushbutton switch 10a, a source of direct current 10b and a current limiting resistor 10c serially interconnected in the named order to produce contact closure type signal.

The magnetic device 22 includes a magnetic core 22a and an electromagnetic coil 22b inductively disposed around the magnetic core 22a and a pair of input ends connected to the resistor 10c and the switch 1a of the signal transmitter 10 respectively.

The depression of the pushbutton switch 10a causes a current from the DC source 10b to flow into the electromagnetic coil 22a through the current limiting resistor 10c to generate a magnetic flux in the magnetic core 22a in the direction of the arrow A shown in FIG. 3.

The flux detector 24 includes a semiconductor magnetically sensitive element 24a and an operational amplifier 24b having a pair of inputs connected across the semiconductor element 24a to amplify an output therefrom. The semiconductor element 24a maybe a Hall effect device, as described in "Introduction to Solid State Physics" by C. Kittel, Wiley & Sons (2 ed. 1956). The amplifier 24b has an output connected to a base electrode of a common emitter transistor T including a collector electrode connected by a collector resistor 24c to a DC source as shown at the arrow and an emitter electrode 24d connected to both the semi-conductor element 24a and the amplifier 24b. The DC source energizes also the semiconductor element 24a and the amplifier 24b.

Upon the magnetization of the magnetic core 22a to produce a magnetic flux therein, the semiconductor magnetically sensitive element 24a provides an output proportional to the density of the magnet flux thus produced. The output from the semiconductor element 24a is amplified by the operational amplifier 24b to supply a base current to the transistor T. This causes the transistor T to be put in its ON state in which a potential at its collector is at a logically low level.

Upon the magnetic flux disappearing, no base current is supplied to the transistor T. Therefore the transistor T is put in its OFF state and has a collector potential maintained at a logically high level.

The signal receiver 18 includes a pair of "NAND" gate circuits 18a and 18b, a light emitting diode 18c and a resistor 18d serially interconnected in the named order. The "NAND" gate circuit 18 a has an input connected to the collector electrode of the transistor T. The resistor 18d is connected at one end to a DC source Vcc. This DC source serves to energize the flux detector 24. While the "NAND" gate circuit 18a has its input put at a logically high level the same produces an output at a logically low level and the "NAND" gate circuit 18b produces an output at a logically high level. With the output from the "NAND" gate circuit 18b put at its logically high level, no current from the DC source Vcc flows through the resistor 18d and the light emitting diode 18c. Thus the diode 18c emits no light. However the application of an input at its logically low level to the "NAND" gate circuit 18a permits a current from the DC source Vcc to flow through the diode 18c to emit light therefrom. The output from the "NAND" gate circuit 18a is shown in FIG. 3 as being supplied to a utilization circuit.

From the foregoing it will be appreciated that in the arrangement of FIG. 3 a signal from the signal transmitter 10, even though it would have a DC level, can be transmitted to the signal receiver 18 through the use of the magnetism as a transmission medium without any mechanical operation performed. Further the inductive disposal of the electromagnetic coil 22b around the magnetic core 22a forms an integrating circuit including an inductance and a resistance to filter out noise included in the signal from the signal transmitter 10. By properly selecting the magnitudes of the inductance and resistance in accordance with the content of noise, the filter 20 as shown is omitted.

In FIG. 4 wherein like reference numerals designate the components identical to those illustrated in FIG. 3, there is shown a modification of the magnetic device 22 as illustrated in FIG. 3. The arrangement illustrated is different from that shown in FIG. 3 only in that in FIG. 4 a pair of electromagnetic coils 22b and 22c are inductively disposed around the single magnetic core 22a and have pairs of input ends 26 and 28 respectively. The transmitter 10 may apply a pair of signals having DC levels to the pair of input ends 26 and 28 respectively.

It is well known that a current flowing through any electromagnetic coil produces a magnetic flux having a direction of flow as determined by the direction of the current flowing through the coil and the winding direction of the coil and a magnitude as determined by a magnitude of the current and the number of turns of the coil. By utilizing the relationship between the magnetic flux and the current as above described, it becomes possible to perform the logical operations concerning the logical sum or "EXCLUSIVE OR" and the logic product or "AND" by using the arrangement of FIG. 4.

More specifically, assuming that the electromagnetic coils 22b and 22c are equal in both the number of turns and winding direction to each other, a pair of signals applied across the input ends 26 and 28 respectively of the electromagnetic coils 22b and 22c will produces magnetic fluxes equal in both direction of flow and flux density as long as the signals cause flows of current through the coils identical in both direction of flow and magnitude to each other. Under these circumstances the logical sum of the signals applied across the input coil ends 26 and 28 can result by designing and constructing the flux detector 24 so as to be operative in response to a signal applied to the magnetic device 22 across either the input ends 26 or the input ends 28. Thus the magnetic device 22 cooperates with the flux detector 24 to act as an "EXCLUSIVE OR" gate.

Further the simultaneous application of the two signals to the magnetic device 22 across both pairs of the input ends 26 and 28 results in a magnetic flux having the same direction and a flux density equal to twice the flux density of the magnetic flux due to that signal applied across either one pair of the input ends 26 and 28 of the magnetic device 22. In that event the magnetic detector 24 can be modified to be operative with twice the magnetic flux density resulting from the application of the signal across either one pair of the input ends 26 and 28. The magnetic detector 24 thus modified is inoperative in response to the separate application of the signals across the input ends pairs 26 and 28 of the magnetic device 22 and is only operative in response to the simultaneous application of the signals to the magnetic device across the input end 26 and 28. This results in the logical operation of forming the logical product of both signals applied across the pairs of input ends 26 and 28. Thus the magnetic device 22 cooperates with the magnetic detector 24 to act as an "AND" gate.

Thus it is seen that the present invention has provided a signal transmission system by which an input signal having a DC level and delivered from a signal transmitter is transmitted to a signal receiver through the utilization of a magnetic flux as the transmission medium, with the transmitter maintained electrically insulated from the receiver and without any mechanical operation performed. In addition, the signal transmission system can logically process a plurality of signals because the resultant magnetic flux is produced corresponding to the result of the logical operation performed with the plurality of signal and then converted to a corresponding signal which is, turn, delivered to the signal receiver. Thus the present invention can simplify the signal transmission circuit and provide an economical construction.

While the present invention has been illustrated and described in conjunction with a few preferred embodiments thereof it is to be understood that numerous changes and modifications may be resorted to without departing from the spirit and scope of the present invention.

What is claimed is:

1. A signal transmission system comprising: signal transmitter means for delivering a pair of signals having respective DC levels, magnetic flux producing means comprising a magnetic core and a pair of coils wound thereon and inductively coupled therewith and connected to said signal transmitter means to each receive a respective one of said signals from said signal transmitter means for producing a corresponding magnetic flux, and flux detector means comprising a semiconductor magnetically sensitive element positioned relative to said magnetic flux producing means to magnetically couple therewith for detecting the magnetic flux and for producing a corresponding electrical signal when the magnetic flux from both of said coils is detected without any mechanical interaction with said signal transmitter means.

2. A signal transmission system, comprising: magnetic flux transmitting means receptive in use of at least one DC electrical signal for transmitting a corresponding DC magnetic flux a signal in response to said DC electrical signal, and magnetic flux detecting means spaced from said magnetic flux transmitting means for magnetically coupling therewith and comprising a semiconductor element responsive to DC magnetic flux for detecting the transmitted DC magnetic flux signal and for developing an output electrical signal corresponding to the transmitted DC magnetic flux signal; wherein said magnetic flux transmitting means comprises a magnetic core; a coil having an inductance and wound around said core and being energizable by said DC electrical signal for developing a magnetic flux in said core and in a region of space beyond said core; and a resistor connected in series with said coil, said resistor having a resistance value selected in accordance with the inductance value of said coil to jointly define with said coil a filter to filter electrical noise from said DC electrical signal applied to said coil and prevent a noise component in said transmitted DC magnetic flux signal.

3. A signal transmission system comprising: magnetic flux transmitting means receptive in use of at least one DC electrical signal for transmitting a corresponding DC magnetic flux signal in response to said DC electrical signal; and magnetic flux detecting means spaced from said magnetic flux transmitting means for magnetically coupling therewith and comprising a semiconductor element responsive to DC magnetic flux for detecting the transmitted DC magnetic flux signal and for developing an output electrical signal corresponding to the transmitted DC magnetic flux signal; wherein said magnetic flux transmitting means comprises a magnetic core; and at least two coils wound about said core and independently and simultaneously energizable by respective DC electrical signals and inductively coupled with said core.

4. A signal transmission system comprising:
   magnetic flux transmitting means comprised of a magnetic core and at least two coils wound about said core and inductively coupled with said core for transmitting a DC magnetic flux signal in response to DC electrical logic signals applied to respective ones of said coils; and
   magnetic flux detecting means positioned relative to said magnetic flux transmitting means to magnetically couple therewith for detecting the transmitted DC magnetic flux signal, wherein said magnetic flux detecting means comprises a semiconductor element responsive to DC magnetic flux for detecting the transmitted DC magnetic flux signal and for developing an output electrical signal corresponding to the transmitted DC magnetic flux signal, an amplifier connected to receive and amplify the electrical output signal developed by said semiconductor element, a transistor, a bias circuit for normally biasing said transistor to a non-conductive state selected in accordance with the magnitude and polarity of the DC electrical logical signals applied to said coils, means for applying the amplified semiconductor element output signal to said transistor to bias it from the non-conductive state to a conductive state, whereby a voltage developed across said transistor and representative of its state of conduction is also representative of whether a magnetic flux is detected by said semiconductor element, and wherein the gain of said amplifier is selected in accordance with the magnitude and polarity of the DC electrical logical signals applied to said at least two coils to set the resultant sensitivity of said flux detecting means so that the voltage developed across said transistor is a logical combination of the DC logic signals applied to said coils and said magnetic flux transmitting means and said magnetic flux detecting means jointly comprise a logic gate.

5. A signal transmission system, comprising:

magnetic flux transmitting means comprised of a magnetic core and at least two coils wound about said core and independently and simultaneously energizable by respective DC electrical signals and inductively coupled with said core for transmitting a DC magnetic flux signal in response to DC electrical signals applied to respective ones of said coils; and magnetic flux detecting means positioned relative to said magnetic flux transmitting means to magnetically couple therewith for detecting the transmitted DC magnetic flux signal, wherein said magnetic flux detecting means comprises a semiconductor element responsive to DC magnetic flux for detecting the transmitted DC magnetic flux signal and for developing an output electrical signal corresponding to the strength of the transmitted DC magnetic flux signal, and circuit means responsive to the semiconductor element output signal for developing a detecting means output signal when the semiconductor element output signal exceeds a threshold value corresponding to the strength of a DC magnetic flux transmitted when only one of said coils receives a DC electrical signal.

* * * * *